Feb. 28, 1933.    A. L. KNAPP    1,899,276
MOTOR VEHICLE
Filed March 25, 1929
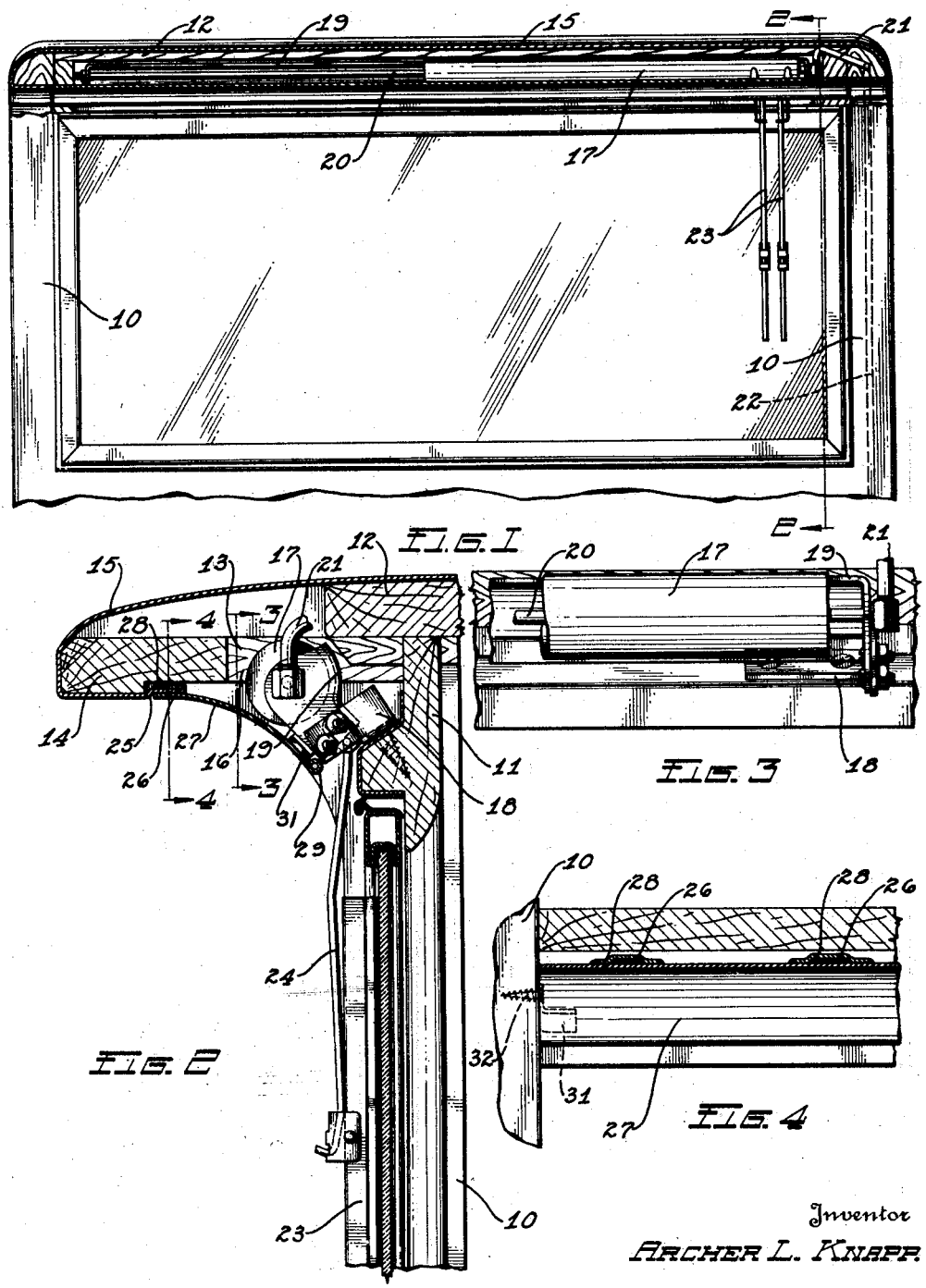
Inventor
ARCHER L. KNAPP Patented Feb. 28, 1933

1,899,276

UNITED STATES PATENT OFFICE

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN

MOTOR VEHICLE

Application filed March 25, 1929. Serial No. 349,543.

This invention relates to motor vehicles and more particularly to windshield cleaners.

An object of the invention is to provide a windshield cleaner having its operating mechanism concealed.

Another object of the invention is to provide a windshield cleaner having the operating mechanism therefor concealed in the visor of a motor vehicle body.

Another object of the invention is to provide a visor for a motor vehicle body with a compartment for the reception of the operating mechanism for a windshield cleaner and to arrange the visor so that the operating mechanism of the windshield cleaner may be completely concealed from view and yet readily accessible.

A further object of the invention is to provide a visor for a motor vehicle body with a compartment for the reception of the operating mechanism for a windshield cleaner. Preferably that type of windshield cleaner having two blades operated to clean the glass of the windshield with a horizontal movement entirely across the face of the glass. The invention contemplates the provision of a visor having a compartment and a panel which may be easily and quickly removed and replaced and when in place completely conceals the compartment.

A further object of the invention is to provide a visor for a motor vehicle body with a compartment enclosed by a panel supported and secured in position to provide a housing having a longitudinal slot parallel to the front head rail of the body.

Still a further object of the invention is to provide a windshield cleaner positioned in the visor of a motor vehicle body and concealed from view by a removable panel, the structure being exceedingly cheap and simple as a whole and in respect to each of its component parts, so that its manufacture may be economically facilitated both as regards parts and their assembly.

Other objects of the invention will appear from the following description taken in connection with the drawing, which forms a part of this specification, and in which:

Fig. 1 is a front elevation of a motor vehicle body, partly in section and partly broken away, illustrating the invention as applied;

Fig. 2 is a vertical sectional view substantially on line 2—2 of Fig. 1;

Fig. 3 is a fragmentary sectional view substantially on line 3—3, Fig. 2 with the panel removed, and Fig. 4 is a fragmentary sectional view substantially on line 4—4 of Fig. 2.

Referring to the drawing for more specific details of the invention, 10 represents the corner posts of a motor vehicle body. The corner posts which are arranged in oppositely disposed relation are connected by a header 11 and a front cross rail 12, and the header is formed in sections or a plurality of members to lend strength and rigidity thereto.

The front cross rail 12 connects corresponding side rail members 13, the forward ends of which are connected by a cross member 14 to provide a frame for a visor 15. The cross rail members 12 and 14 are suitably spaced to provide a compartment 16 adaptable for housing a suitable motor 17 for operating a windshield cleaner.

The motor 17 is supported in the compartment 16 on suitable brackets 18 secured to the header 11. As shown, a guide 19 is bolted or otherwise secured to the brackets 18 and a pipe 20 is supported between the respective ends of the guide. The pipe 20 provides a suitable support for the motor 17 which is mounted to reciprocate freely thereon, and also an adequate connection between the motor and a suitable source of power, such as the intake manifold of an engine. As shown, the pipe 20 is connected to the source of power by a hose section 21 housed within one of the columns 10, as indicated at 22, so that it may be completely concealed from view.

Squeegees or blades 23 are supported on arms 24 positioned for reciprocation on the pipe 20 and operatively connected to the motor. The blades are moved by the motor horizontally across the entire face of the windshield glass. Any other suitable means for operating the blades in this manner may be employed.

The covering forming the visor 15 is bent downward and backward to cover a portion of the cross member 14 and the backward extending portion is provided with an offset 25 having thereon a plurality of tongues or clips 26 arranged in spaced relation. A panel 27 is provided on one edge with a plurality of keeps 28 arranged to register with the tongues 26. This edge of the panel is adapted to fit snugly in the offset portion 25 and the keeps 28 thereon are adapted to receive the tongues 26 so that the panel 27 is supported in such relation to the backward extending portion of the visor as to lend a smooth unbroken surface between the connecting parts.

In position the panel 27 extends from the visor cover 15 rearwardly and downwardly between the posts 10 to a point adjacent the header 11, thus effectively concealing the wiper motor 17. The rear edge of panel 27 is rolled, as indicated at 29, to effect a finish. This edge of the panel is in spaced relation to the adjacent edge of the header 11 so that they cooperate to form a transverse slot through which the wiper arms 24 project.

The panel 27 has spot welded or otherwise secured on its respective ends adjacent the edge 29 suitable clips 31 adapted to receive screws 32 by which the panel is secured to the columns 10. Upon removing the screws 32 the panel 27 may be moved backward to disengage the keeps 28 from the tongues or clips 26, so that the panel may be readily removed to gain access to the motor for the purpose of replacement and repair.

Although this invention has been described in connection with certain specific embodiments, the principles involved are susceptible of numerous other applications which will readily occur to persons skilled in the art. The invention is, therefore, to be limited only as indicated by the scope of the appended claims.

Having thus described the various features of my invention, what I claim as new and desire to secure by Letters Patent is:

1. In a motor vehicle body having a forwardly extending roof providing a visor, a cover for the visor, a cross header associated with the visor forming a transverse compartment therebetween for receiving a windshield wiper operating mechanism, and a removable panel associated with the visor cover and header concealing the wiper operating mechanism; means for securing the removable panel to the visor cover comprising a plurality of tongues on the rear edge of the visor cover and a plurality of keeps on the front of the removable panel with which the tongues interengage.

2. In a motor vehicle body having a forwardly extending roof providing a visor, a cover for the visor, a cross header associated with the visor providing a transverse extending compartment, windshield wiper mechanism positioned in the compartment, a pair of upright posts in parallel spaced relation supporting the cross header and visor, and a removable panel positioned between the visor cover and the posts to effectively conceal the wiper mechanism; means for removably securing the front edge of the panel to the visor cover, and means for removably securing the rear edge of the panel to the posts.

3. In a motor vehicle body having a forwardly extending roof providing a visor, a cross header associated with the visor providing a transverse extending compartment, windshield wiper mechanism positioned in the compartment, a pair of upright posts supporting the cross header and visor, and a removable panel positioned between the visor and the posts to effectively conceal the wiper mechanism in the compartment; detachable securing means engaging the rear edge of the removable panel and the posts.

4. In a motor vehicle body having a forwardly extending roof providing a visor, a cover for the visor, a cross header associated with the visor providing a transverse extending compartment therebetween, a windshield wiper mechanism positioned in the compartment, and a removable panel positioned between the visor cover and the cross header to effectively conceal the wiper mechanism; means on the visor cover and means on the removable panel adapted to slidably interengage to secure the panel in position.

5. In a motor vehicle body having a forwardly extending roof providing a visor, a cross header associated with the visor in a manner forming a transverse extending compartment, windshield wiper mechanism positioned in the compartment, a pair of upright posts in parallel spaced relation supporting the cross header and visor, and a removable panel positioned between the visor and the posts to effectively conceal the wiper motor; means for fixing said panel in position comprising clips fixed to the panel and means detachably securing the clips to the posts.

6. In a motor vehicle body having a forwardly extending roof providing a visor, a cover for the visor extending rearwardly and having an offset end portion, a pair of upright posts in parallel spaced relation supporting the front of the roof; a removable panel abutting the offset portion of the visor cover and extending downwardly and rearwardly to the posts, said panel being detachably secured to the visor cover and posts and forming a substantially unbroken continuation of the main rearwardly extending portion of the visor cover.

7. An automobile embodying therein a windshield, a top, means providing a hollow visor associated with said top in advance of the windshield and including a bottom wall having an opening therein, and a plate closing said opening and adapted to conceal within the visor and permit access to an actuator for a wiper blade associated with the windshield.

In testimony whereof I affix my signature.

ARCHER L. KNAPP.